(12) United States Patent
Weigold et al.

(10) Patent No.: US 6,683,686 B2
(45) Date of Patent: Jan. 27, 2004

(54) TEMPORALLY RESOLVED WAVELENGTH MEASUREMENT METHOD AND APPARATUS

(75) Inventors: Adam Mark Weigold, Unley (AU); Peter Graham Foster, Belair (AU)

(73) Assignee: Photonica PTY LTD, Adelaide (AU)

( * ) Notice: Subject to any disclaimer, the term of this patent is extended or adjusted under 35 U.S.C. 154(b) by 0 days.

(21) Appl. No.: 09/972,037

(22) Filed: Oct. 9, 2001

(65) Prior Publication Data

US 2002/0044280 A1 Apr. 18, 2002

Related U.S. Application Data

(60) Provisional application No. 60/238,427, filed on Oct. 10, 2000.

(51) Int. Cl.[7] .................................................. G01J 3/28
(52) U.S. Cl. ........................ 356/326; 356/328; 356/333; 356/334
(58) Field of Search ................................ 356/326, 328, 356/331–334

(56) References Cited

U.S. PATENT DOCUMENTS

| | | | |
|---|---|---|---|
| 3,992,101 A | 11/1976 | Dapper et al. | |
| 4,732,476 A | 3/1988 | Barshad | |
| 4,969,740 A | * 11/1990 | Sonobe | ........................ 356/326 |
| 5,596,406 A | * 1/1997 | Rosencwaig et al. | ....... 356/328 |
| 5,710,627 A | 1/1998 | Inoue et al. | |
| 5,784,159 A | 7/1998 | Iwasaki | |
| 6,174,677 B1 | * 1/2001 | Vo-Dinh | ...................... 356/301 |
| 6,452,674 B1 | * 9/2002 | Fujiyoshi | ..................... 356/328 |

* cited by examiner

Primary Examiner—F. L Evans
Assistant Examiner—Kara Geisel
(74) Attorney, Agent, or Firm—Larson & Taylor PLC

(57) ABSTRACT

The invention provides a method and apparatus for determining the wavelength of a sample source of light, the apparatus having a reference light source of known wavelength, a collimator for collimating light from the sample source and from the reference source, a dispersing means for receiving and spatially dispersing collimated light from the collimator according to wavelength, focusing means for focusing dispersed light from the dispersing means, and a photodetector located in the focal plane of the focusing means and having an aperture for spatially selectively admitting light from the focusing means, and operable to provide a temporally calibratable output signal indicative of the wavelength of the selectively admitted light, wherein the apparatus is operable to scan the focused spatially dispersed beam across the aperture, and the photodetector output includes resolvable features corresponding to light from the reference source and sample source, whereby a time difference between the features is indicative of a wavelength difference between the light from the reference source and the sample source.

95 Claims, 4 Drawing Sheets

TEMPORALLY RESOLVED WAVELENGTH MEASUREMENT METHOD AND APPARATUS

This application is based on and claims the benefit of the filing date of U.S. provisional application Ser. No. 60/238,427 filed Oct. 10, 2000.

TECHNICAL FIELD

The present invention relates to a method and apparatus for performing temporally resolved wavelength measurements and power measurements, of particular application in an optical spectrum analyzer in which measurements performed in the time domain are used to calculate the wavelength and power spectrum of a laser or other light source.

BACKGROUND ART

In applications such as optical telecommunications there is a need for small, portable, rugged and low cost devices that can accurately measure the wavelength and power spectrum of a laser or other light source with improved resolution, increased measurement speed and reduced cost. Parameters of importance in optical spectrum analyzers include wavelength range, wavelength resolution, wavelength accuracy, optical sensitivity, power calibration accuracy and dynamic range.

Existing devices, such as commercially available optical spectrum analyzers, employ spatially resolved methods in which measurements of spatial parameters are used to calculate wavelength spectra of the input light. Generally, input light is firstly collimated and then spectrally dispersed by a diffraction grating. The resulting diffracted light is then typically reflected from several mirrors or diffraction gratings before exiting a slit aperture and is detected by a photodetector. The wavelength range is scanned by adjusting the angle of the diffraction gratings, the position of the photodetector, or both. The spatially resolved data is translated to wavelength data by calibrating against a known reference source. The result is a wavelength spectrum relating the relative intensity of the light source at a measured position or angle to the wavelength of the light source over a given range of values. A feature common to existing systems, therefore, is the performance of measurements in the spatial domain and the collection of data while varying a parameter such as detector position or grating angle. The relative accuracy and resolution of this technique is dependent on the relative positioning accuracy and translational stability of both moving and fixed mechanical components.

U.S. Pat. Nos. 5,233,405 and 5,359,409 disclose similar double-pass scanning monochromator designs for use in an optical spectrum analyzer device, in which an input light beam is spatially dispersed by a diffraction grating and passed through a slit so that a portion of the dispersed light beam can be selected. The monochromator based optical spectrum analyzer includes a motor for rotating the diffraction grating and a shaft angle encoder for sensing grating position. The light that passes through the slit is recombined to produce an output light beam. The input light beam is incident on the diffraction grating during first and second passes. A polarization rotation device rotates the polarization components of the light beam by 90° between the first and second passes so that the output of the monochromator is independent of the polarization of the input light beam. An output optical fiber is translated by a micropositioning assembly in a plane perpendicular to the output light beam during rotation of the diffraction grating to automatically track the output light beam and to provide optical chopping.

U.S. Pat. No. 5,497,231 discloses a monochromator design utilizing a beam-diffracting scanning mirror on a oscillated spring. The spring acts as an electromechanical self-energized oscillation circuit; a sensor detects the deflection of the spring, its output used as a feedback signal for maintaining the spring's oscillation.

U.S. Pat. No. 5,886,785 discloses an optical spectrum analyzer for an incident light beam and a process for analyzing the corresponding spectrum. The spectrum analyzer comprises addressing means, a diffraction grating, a reflecting dihedron, a device for adjusting the rotation of the reflecting dihedron and reception means. A polarization separator divides the incident beam into first and second parallel secondary beams of linearly polarized light along the directions parallel to and perpendicular to the grooves in the grating respectively, and a $\lambda/2$ plate placed on the path of the first secondary beam applies a perpendicular polarization direction to this beam. The grating diffracts the secondary beams a first time, the reflecting dihedron exchanges their directions, the grating diffracts them a second time, the $\lambda/2$ plate applies a 90° rotation to the polarization state of the second secondary beam and the separator recombines the secondary beams into a single main beam returned to reception means.

U.S. Pat. No. 6,097,487 discloses a device for measuring wavelength, including an interrogation broadband light source and a tunable optical filter. A first portion of the light transmitted through the filter and reflected from, or transmitted through, a fiber Bragg grating of known Bragg wavelength to provide an absolute wavelength reference, and directed to a first detector. A second portion of the light is transmitted through the filter and transmitted through, or reflected from a Fabry-Perot filter with fixed and known free spectral range to create a comb spectrum sampling the interrogation source spectrum to provide an accurate frequency/wavelength scale.

However, there are physical limits to parameters such as grating spacing and slit aperture size. Improvements in resolution and wavelength range require either increased optical path lengths or additional scanning elements (such as secondary diffraction gratings). A greater number of moving parts increases the complexity, instability and cost of the apparatus. Design instability and susceptibility to shock can produce inaccurate measurements in environments that require portability and ruggedness. Consequently improvements in wavelength resolution, scanning speed and scanning range are generally achieved at the expense of increased cost or size, and reduced portability.

Existing optical spectrum analyzers relate the wavelength of light to data measured in the spatial domain by varying and monitoring a parameter such as detector position or grating angle. The relative accuracy and resolution of this technique depends on the relative positioning accuracy and translational stability of moving and fixed mechanical components. The construction of accurate and repeatable mechanical translation and oscillation assemblies leads therefore to a high cost of manufacture.

U.S. Pat. No. 4,732,476 discloses a rapid scan spectrophotometer device that measures the spectral transmission of sample materials that are illuminated by a broadband light source. The spectrophotometer device is a different type of apparatus from an optical spectrum analyzer and has different functions and applications. The disclosed spectrophotometer—in order to measure the relative wavelength parameter—relates that parameter to the temporal difference between detected signals of different wavelengths as they are scanned past a photodetector at a constant speed. Hence, the relative transmission spectra is calculated using, in part, a temporally resolved measurement technique. However, although this spectrophotometer design has advantages in device cost and complexity, its calibration accuracy depends on the incorporation of spatial measurements and the positioning stability of mechanical components.

SUMMARY OF THE INVENTION

It is an object of this invention to provide a new temporally resolved method of measuring at least some properties of a light source.

The present invention provides, therefore, an apparatus for determining the wavelength of a sample source of light, said apparatus having:

- a reference light source of known wavelength;
- a collimator for collimating light from said sample source and from said reference source;
- a dispersing means for receiving and spatially dispersing collimated light from said collimator according to wavelength;
- focusing means for focusing dispersed light from said dispersing means; and
- a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source.

Preferably said apparatus includes a beam splitter and a further photodetector, said beam splitter directing some of said light from said sample source and from said reference source to said further photodetector, wherein said further photodetector is operable to provide an output signal indicative of said power of said sample source.

Preferably said light from said reference source is coupled to said light from said sample source optically after said beam splitter and optically before said collimator, to provide collinear beam propagation without affecting the accuracy of power measurements of the sample light.

Preferably said apparatus is operable to determine the integrated power of said sample source independent of the wavelength spectrum of said sample source, and said further photodetector output is indicative of the total power of said light from said sample source.

The photodetectors may be provided as a single photodetector.

Preferably said apparatus includes an input aperture for admitting said light from said sample source into said apparatus.

Preferably said beam splitter comprises a partially reflecting mirror.

Preferably said apparatus is operable to avoid or minimize unwanted detection of light from said reference source by removing signals indicative of said unwanted light from sample data by gating or time multiplexing said light from said reference source and said light from said sample source.

Preferably said apparatus directs said focused, dispersed beam in a direction that rotates relative to said aperture with substantially constant angular velocity.

Thus, the focused light is scanned across the aperture so that output spectrum can be produced that is effectively sample source intensity as a function of time (relative to the reference source) or, as the wavelength of the reference source is known, versus wavelength. Light may be admitted from the sample light source from the tip of an optical fiber or the like; the light itself may be from, for example, a laser.

The dispersing means may be either a mechanical dispersing means, such as a diffraction grating or prism, or a non-mechanical dispersing means, such as those employing acousto-optic, electro-optic or non-linear beam dispersing methods, or combinations of both mechanical and non-mechanical dispersing means.

It should be understood that the aperture may take many forms, including a physical aperture in a mask over the photodetector, the core of an optical fiber (the core providing the spatial filtering) or simply that portion of the face of the photodetector that admits light for detection.

In embodiments in which the dispersing means is mechanical, the relative rotation of the spatially dispersed beam will generally be provided by rotating the dispersing means relative to the other optical elements. This will most commonly be achieved by rotating the dispersing means, but it is envisaged that, in some embodiments, the dispersing means will be stationary while some or all of the other optical elements are rotated as necessary to scan the spatially dispersed beam across the aperture. In the latter case, the dispersing means would, though stationary, be rotating in the reference frame of those other elements.

Preferably said dispersing means is a diffracting means, and more preferably a rotatable diffraction grating. In one embodiment, the dispersing means is a rotatable prism.

Preferably said reference source is a stable light source of ultra-narrow linewidth.

This narrow linewidth reference source could be provided, however, in the form of a broadband source with a suitable filter (such as an acetylene absorption cell filter).

Preferably said collimator is a collimating mirror. Preferably said focusing means is a focusing mirror.

However, any other suitable collimators could be employed, such as a collimating lens. Similarly, a focusing lens could be used as the focusing means.

Preferably said apparatus is operable to use said reference source to measure the speed of revolution of said dispersing means.

Preferably said apparatus includes a wavelength data analysis system for resolving said photodetector output signal with respect to time and translating the temporal data to calibrated wavelength data.

Preferably said apparatus is operable as a single pass scanning wavelength measurement device. Alternatively, said apparatus is operable as a double pass or multiple pass scanning wavelength measurement device.

Preferably the apparatus includes means for time averaging and statistically analysing collected data so that more accurate power and wavelength data can be produced from said apparatus.

Preferably the apparatus includes a plurality of photodetectors disposed about said dispersing means, to improve resolution, accuracy, dynamic range or sampling rate.

Thus, an advantage of this embodiment is that, as the spectrum is constantly moving relative to the photodetector, it has the chance to pass via several detectors that can measure several different parameters in several different ranges. The speed of the rotation can be adjusted to ensure a large enough signal. Also, the size of the detector apertures and detector response capability all relates to the practical resolution, accuracy and dynamic range achievable with the apparatus.

Preferably the apparatus includes a plurality of dispersing means to increase resolution, accuracy or sampling rate.

Preferably said apparatus is operable to measures the relative power versus wavelength and total power spectrum, includes a plurality of photodetectors, and calibration means for calibrating the amplitude of the outputs of said photodetectors versus wavelength.

The present invention further provides a method of determining wavelength of a sample source of light, involving:

providing a reference beam of light of known wavelength;

collimating light from said sample source and collimating light from said reference beam;

dispersing said collimated light to produce a spatially dispersed beam;

focusing said dispersed beam;

scanning said focused, dispersed beam across a detector aperture and to thereby spatially selectively detect focused light and produce a temporally calibratable output signal indicative of said selectively detected light; and resolving features corresponding to said light from said sample source and to said reference beam;

whereby a time difference between said features is indicative of a wavelength difference between said reference beam and said light from said sample source.

Preferably the method includes:

beam splitting said light from said sample source and said reference beam;

directing some of said light from said sample source and some of said reference beam to a further detector; and generating an output signal indicative of said power of said sample source.

Preferably the method includes coupling said reference beam to said light from said sample source after said beam splitting and before said collimating, to provide collinear beam propagation without affecting the accuracy of power measurements of the sample light.

Preferably the method includes determining the integrated power of said sample source independent of the wavelength spectrum of said sample source, wherein said output signal is indicative of the total power of said light from said sample source.

Preferably said detector and said further photodetector are provided as a single photodetector.

Preferably the method includes admitting said light from said sample source through an input aperture.

The collimated beam may be dispersed by means of any suitable mechanical or non-mechanical dispersing means. Preferably the collimated beam is dispersed by means of a diffracting means, and more preferably by means of a rotatable diffraction grating. Preferably said method includes using said reference beam to measure the speed of revolution of said diffracting means.

Preferably the method includes detecting said focused light by means of a plurality of photodetectors disposed about said dispersing means, to improve resolution, accuracy or sampling rate.

When a plurality of photodetectors is employed in an optical spectrum analyzer, the amplitude of the outputs from the photodetectors is preferably calibrated versus wavelength. In one example of such an arrangement, the plurality of photodetectors includes a reference measurement of said reference beam in the form of a thermoelectric detector whose measurement is independent of wavelength.

Preferably said method includes directing some of said reference beam and some of said light from said sample source to a photodetector and determining the power of said sample source. This may be done by means of a beam splitter, preferably in the form of a partially reflecting mirror. There are numerous possible embodiments of the beam splitter including the use of 4% Fresnel reflection from an uncoated piece of glass or other beam sampling means. The sampled portion of the input beam can be used as the reference measurement of optical power. All measurements of optical intensity by the plurality of calibrated detectors can then be referenced back to this wavelength independent reference power measurement.

Preferably the method includes increasing any one or more of resolution, accuracy and sampling rate by employing a plurality of diffracting means.

Preferably the method includes providing said reference beam by means of a stable light source of ultra-narrow linewidth.

In one embodiment, said reference beam is provided by means of a broadband light source with a suitable filter (such as an acetylene absorption cell filter).

Preferably said light from said sample source and said reference beam is collimated by means of a collimating mirror. Preferably said dispersed beam is focused by means of a focusing mirror.

Preferably said method includes translating temporal data to calibrated wavelength data.

Preferably said method is a single pass scanning method. Alternatively, said method is a double pass or multiple pass scanning method.

Preferably the method includes time averaging and statistically analysing collected data to produce more accurate wavelength data.

Preferably the method includes converting acquired temporal data into spectral and power measurements.

Preferably the method includes calculating the relative power distribution by calibrating the intensity of output signal, from a photodetector with the known wavelength response of the photodetector material and the total power of the sample source. Preferably said photodetector is a fast response photodetector.

Preferably the method includes measuring the total power distribution by performing time integrated measurements on a fixed portion of the sample beam, preferably by using a wavelength independent slow response photodetector such as a thermopile or pyroelectric detector.

In yet another embodiment, the system can be operated without a reference light source present during measurement of said light from said sample beam. In one embodiment, a mirror reflection is obtained from a rotating mounting of a dispersing means. This may be a mirror on the rear of the dispersing element or more preferably in the case of a rotating diffracting means may be the zero order diffracted beam which includes all wavelengths present in said sample beam.

This zero order diffracted beam may be used to provide the timing marker for measurement of angular velocity. An initial calibration of the system may be performed using a reference optical source whereby rotation rate is linked to temporal spread of the known optical reference source. Said calibration information of spectral spread versus rotational speed can then be stored in the device.

In yet another embodiment, said beam splitter is a fiber-optic beam splitter that transmits the majority of the input signal for wavelength measurement via an optical fiber output. This output fiber may be connected to the output fiber from said reference source which is coupled to the input sample source via a coupling device that is positioned after the beam splitter.

This arrangement provides good collinear propagation of the reference and sample beam propagation into the wavelength measurement portion of the apparatus. It also means that the reference and sample sources could be operated simultaneously and this design would not require gating or time multiplexing of the reference and sample sources to avoid potential errors in total power measurements.

BRIEF DESCRIPTION OF THE DRAWINGS

In order that the present invention may be more clearly ascertained, a preferred embodiment will now be described, by way of example, with reference to the accompanying drawing, in which.

DETAILED DESCRIPTION OF PREFERRED EMBODIMENTS

Figure 1:
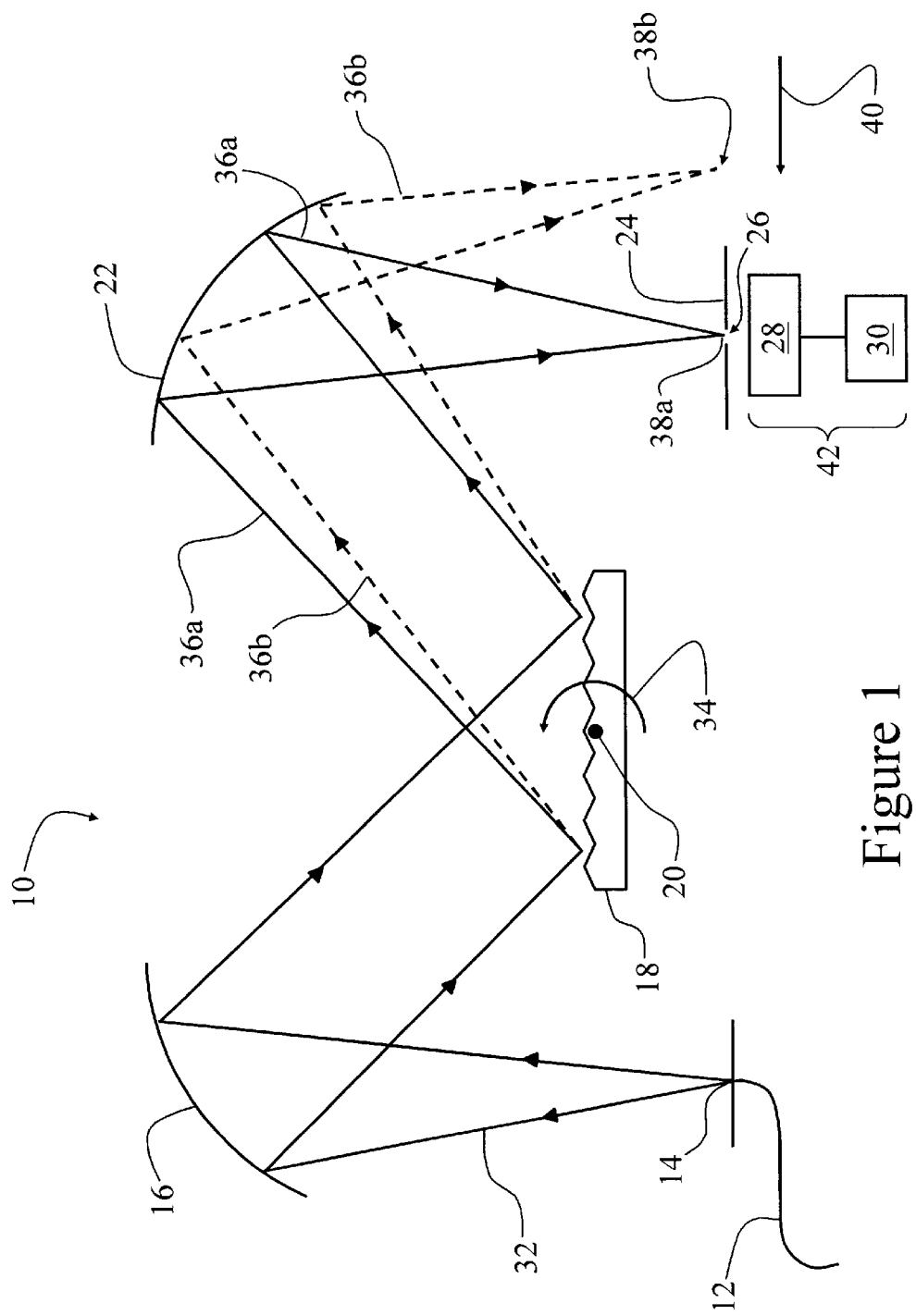
FIG. 1 is a schematic view of a optical spectrum analyzer and monochromator apparatus according to a preferred embodiment of the present invention.

An optical spectrum analyzer and monochromator apparatus according to a preferred embodiment of the present invention is generally at 10 in FIG. 1. The apparatus 10 includes an input optical fiber 12, an input aperture 14, a collimator in the form of collimating mirror 16, a dispersing means in the form of diffraction grating 18 (of nominal grating period 600 grooves/mm and rotatable about axis 20), focusing mirror 22, detector mask 24 provided with detection aperture 26, photodetector 28 and wavelength data analysis unit 30.

The diffraction grating 18 is mounted on a drum (not shown) rotated by any suitable technique; in this embodiment an electrical motor (also not shown) is used to rotate the diffraction grating 18.

Light from a sample light source (not shown) is admitted to the apparatus 10 through optical fiber 12, and diverges from entry aperture 14, which thereby functions as a diverging point source. The diverging beam 32 is collimated by collimating mirror 16 and directed to the diffraction grating 18, which is rotating in the direction indicated by arrow 34 about grating axis 20, perpendicular to the planar beam path of the apparatus 10. The diffraction grating 18 disperses the light into a spatially dispersed beam represented by exemplary rays 36a and 36b, or respectively first wavelength $\lambda_1$ and second wavelength $\lambda_2$. Light 36a and 36b reflected from diffraction grating 18 onto focusing mirror 22 is refocused to respective foci 38a and 38b.

Fixed detection aperture 26 is located in the focal plane of focusing mirror 22. As the diffraction grating 18 rotates in the direction indicated by arrow 34 (anti-clockwise as shown in FIG. 1), the focal points 38a, 38b for the two wavelengths $\lambda_1$ and $\lambda_2$ move in the direction indicated by arrow 40 (viz. to the left as shown in FIG. 1). Light of each wavelength $\lambda_1$ and $\lambda_2$ passes through the detection aperture 26 at different times (according to which wavelength is focused at aperture 26) and is detected by the photodetector 28, whose output is passed to the data analysis unit 30. The spectrally dispersed beam 36a, 36b is scanned across a fixed detector (comprising fixed aperture 26 and photodetector 28) to produce a time varying signal that is dependent on the speed of the rotation of the diffraction grating 18. The data analysis unit 30 incorporates algorithms to calibrate the detected signal with respect to wavelength taking into account the variation of efficiency of the diffraction grating 18 and the photosensitivity of the photodetector 28. The data analysis unit 30 is also synchronized to a reference signal from a reference source, as will be described below.

As the diffraction grating 18 rotates in the direction indicated by arrow 34, the focal point 38a of light 36a of first wavelength $\lambda_1$ is scanned in direction 40 across the aperture 26, and collected by the data acquisition system or wavelength measurement unit 42 (comprising photodetector 28 and data analysis unit 30). The collected data is a function of the temporal delay between the signal relative to a stable reference source (discussed below). The temporal data is a function of the angular speed of rotation of the diffraction grating 18, and the wavelength of the signal.

In use, light from a stable reference wavelength source of ultra-narrow linewidth is introduced into the apparatus 10, as a timing reference, via fiber 12 with the optical signal being tested. The reference signal sweeps across the detection system with each revolution of the diffraction grating 18, and thereby provide a synchronisation signal for a temporal data collection cycle for that revolution, relative to which the acquired data can be calibrated. The time difference between a collected data point (from the sample source) and the reference source is then indicative of the wavelength difference between the two; the wavelength of the data point can then be determined from the known reference source wavelength and this time difference.

Thus, rather than having to determine accurately the positions of the diffraction grating 18 and the other optical elements of the apparatus 10, the analysis of the collected data utilizes the time dependence of this position. The time series of the data collected by the wavelength measurement unit 42 is directly related to the wavelength scale of the apparatus 10, to within an accuracy that depends on the stability of the rate of rotation of the diffraction grating 18.

If the diffraction grating 18 is rotated at a rate of 10 Hz (600 rpm), and the timing system is based on a 1 GHz clock (timing systems based on gigahertz clock rates with sub-nanosecond response times are commonplace), data can be obtained at the rate of $10^8$ per revolution. If a spectrum containing all commonly used optical telecommunications bands (nominally 800–1600 nm) is dispersed by the diffraction grating 18 into an angular spread of approximately 100°, then there is a maximum of 27,000,000 samples across the entire wavelength scanning range of 800 nm. This corresponds to a spectral resolution of approximately $3\times10^{-5}$ nm (0.3 mÅ) per clock cycle. This provides a theoretical spectral resolution limit that is orders of magnitude better than the spectral resolution available in prior art systems.

In addition, the rotation speed of the diffraction grating 18, and hence the sampling rate of the device, can be increased at the expense of wavelength resolution and accuracy. For example, a maximum sample rate of 10 kHz would correspond to a theoretical resolution of $3\times10^{-2}$ nm (30 mÅ). In turn, the resolution can be increased at the expense of sample rate.

The absolute wavelength accuracy of the apparatus 10 is also determined by the linewidth of the clocking of the reference source and the stability and repeatability of the speed of rotation of the diffraction grating 18.

The rotation rate of the diffraction grating 18 can be monitored by counting the time between successive sweeps of the reference signal across the detector. Any drift in the rate of rotation can be accounted for through the statistical accumulation of data performed by the data acquisition unit 30. Each time the diffraction grating 18 completes one full revolution, another time series is collected and the statistical accuracy of the measurement is improved.

The potential accuracy of the apparatus 10 for one full revolution may be estimated as follows. If a relatively large uncertainty in the measurement of the rotation speed at a nominal 10 Hz rotation rate of 0.1% is assumed (i.e. a potential variation in the rotation speed between 10.00 Hz to 10.01 Hz without being detectable by the apparatus 10) would result in an inaccuracy of ±1 nm for a 1 $\mu$m source after a single revolution.

This accuracy is readily achievable using commercially available rotating motor devices without any actual monitoring of the rotation speed of the diffraction grating 18. In practice, with accurate monitoring of this rotation speed, irrespective of fluctuations in motor speed, this uncertainty can be improved by possibly an order of magnitude. Hence, with existing rotating motor devices and simple speed measurement techniques, an uncertainty in wavelength approaching as little as ±0.2 nm may be possible.

This estimate of uncertainty in wavelength should be seen as an upper limit, as it only accounts for a single scan across the wavelength range. In some preferred embodiments, multiple photodetectors are used to produce multiple measurements of the wavelength spectrum in a single sweep of the spectrum. Multiple measurements of the wavelength enable an improvement in the statistical uncertainty of the calibrated wavelength.

One possible embodiment employs multiple photodetectors, in which these photodetectors are coupled with multiple focusing lenses, slits and photodetectors that are located at several distinct positions along the path of the scanning dispersed spectrum. Another embodiment includes a small, low cost detector array placed behind a single focusing lens and slit. It is estimated that such multiple photodetector arrangements are capable of improving the wavelength uncertainty to as little as ±0.05 nm.

After data is acquired for many revolutions, a statistical sample space can be built up and standard statistical algorithms can be used to improve the dynamic range of the apparatus 10. Multiple scans and longer integration times lowers the detectable noise signal and subsequently enables a increased dynamic range. For example, after 10 revolutions the dynamic range may be improved by a factor of approximately 3. After 100 revolutions the dynamic range can be improved by a factor of 5, and so on.

The accuracy and resolution of temporally resolved wavelength measurements are ultimately dependent on the accuracy of temporal measurements and the calibration of this data to the angular rotation of the said dispersing element. These parameters can be known to a sufficient degree of accuracy using a simple, small, robust design that is cost effective. In comparison, the accuracy of spatially resolved measurements is ultimately limited by the accuracy of measurement of the angle of the diffraction grating or position of the detector. For optical spectrum analyzer designs of comparable size and complexity, these spatial measurements are inherently more inaccurate and subject to misalignment than measurements temporal measurements of the rotation speed for say a rotating drum.

Sources of potential measurement error are more easily controlled and minimized using the temporal resolution method. By measuring in the time domain according to the present invention rather than the spatial domain, potential wavelength resolution and accuracy is improved without sacrificing apparatus compactness, simplicity or cost.

Figure 2:
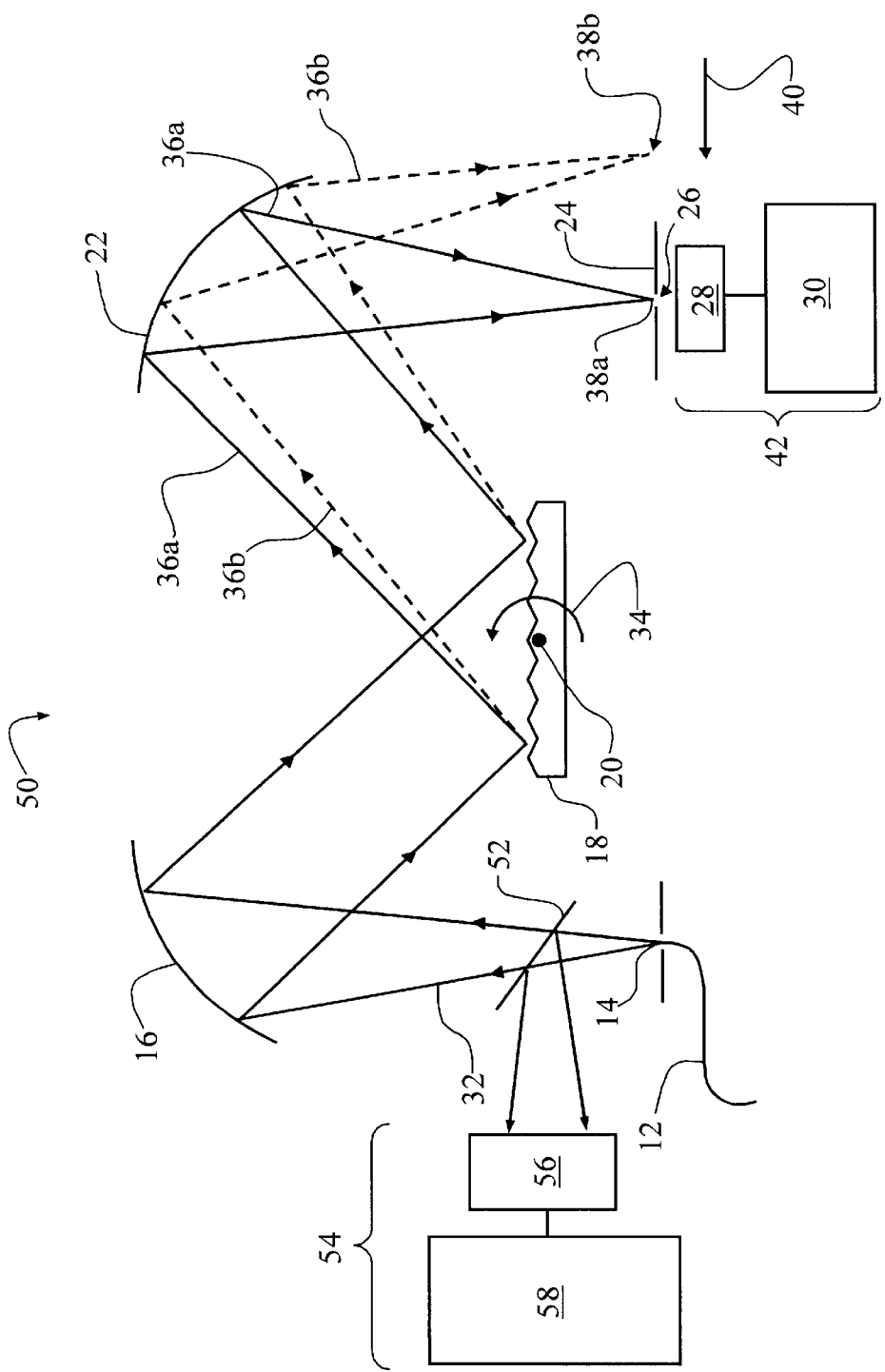
FIG. 2 is a schematic view of an optical spectrum analyzer apparatus according to another preferred embodiment of the present invention.

An optical spectrum analyzer apparatus according to another preferred embodiment of the present invention is shown generally at 50 in FIG. 2. Like reference numerals have been used to indicate like features to those of FIG. 1. Like optical spectrum analyzer and monochromator apparatus 10, apparatus 50 includes an input optical fiber 12, an input aperture 14, a collimating mirror 16, diffraction grating 18 (of nominal grating period 600 grooves/mm and rotatable about axis 20), focusing mirror 22, detector mask 24 with detection aperture 26, first photodetector 28 and wavelength data analysis unit 30, the first photodetector 28 and the wavelength data analysis unit 30 together constitute a calibrated wavelength measurement unit or temporal data acquisition system 42. The diffraction grating 18 is again mounted on a drum (not shown) rotated by an electrical motor (also not shown).

However, apparatus 50 also includes a beam splitter 52 and a total power measurement unit 54 comprising second photodetector 56 and power data analysis unit 58.

The total power measurement unit 54 and the calibrated wavelength measurement unit 42 perform translation and calibration calculations on temporally resolved data and combine this information to produce an accurately calibrated optical spectrum analysis of the sample light source. The power and wavelength measurement units 54, 42 also provide feedback to control the reference light source (not shown) or the wavelength and power accuracy and dynamic range.

In other respects, optical spectrum analyzer apparatus 50 operates to measure wavelengths as described for the optical spectrum analyzer and monochromator apparatus 10 of FIG. 1.

If the apparatus 50 is operated using a rotational frequency of 5 Hz, a sampling rate of 30 kHz, a collimated beam size on the grating of 10 mm and a wavelength of 1700 nm will yield a resolution of 0.2 nm. This resolution will improve by a factor of two to 0.1 nm at 850 nm and can be further increased by decreasing the focal length of the mirror. At the same time the angular spread of the wavelength range between 700 and 1700 nm will be around 50°, which poses no significant measurement problem. This range can also be increased substantially by using two different types of detector, such as an InGaAs detector and a silicon detector.

Figure 3:
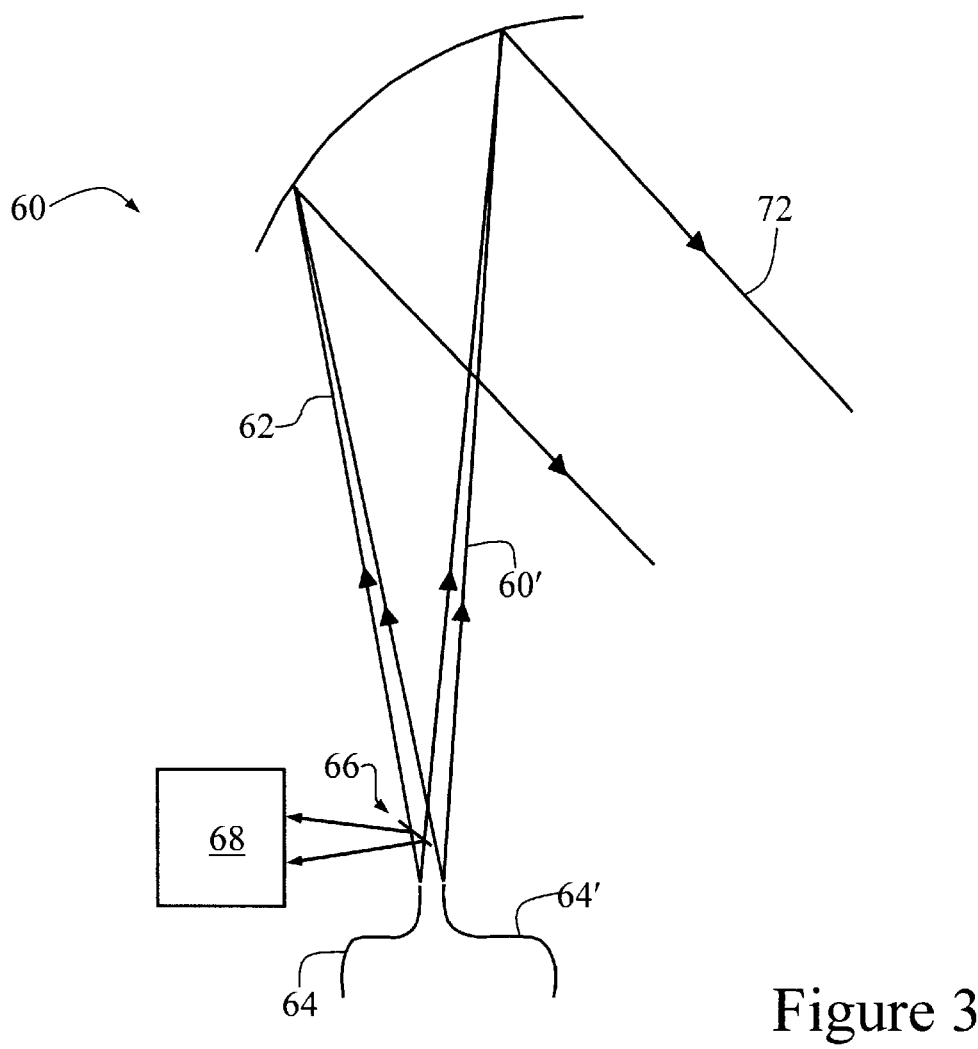
FIG. 3 is a schematic view of an optical spectrum analyzer apparatus according to another preferred embodiment of the present invention, in which sample and reference beams are coupled optically after a beam splitter.

FIG. 3 is a schematic view of a detail 60 of an optical spectrum analyzer apparatus according to another preferred embodiment of the present invention, in which sample and reference beams are coupled optically after a beam splitter in order to provide collinear beam propagation without affecting the accuracy of power measurements of the sample light. In FIG. 3, those portions of the apparatus optically after collimating mirror 16 have been omitted for the sake of clarity.

Rather than coupling the light from the sample and reference sources before admitting that light to the apparatus, light 62 from the sample source and light 62' from the reference source is admitted separately through respective identical optic fibers 64 and 64'. Sample light 62 and reference light 62' are admitted through identical apertures, such as pinholes or the ends of the cores of respective optic fibers 62 and 62'.

As in the apparatus 50 of FIG. 2, a beam splitter 66 is located optically after the sample light 62 is admitted to the apparatus, and directs a portion of that light 62 to a total power measurement unit 68. However, in this embodiment the beam splitter 66 is located optically before the sample light 62 and the reference light 62' are coupled. Instead, that coupling occurs at collimating mirror 70. It should be noted that FIG. 3 is not to scale and that the distance between the fibers 62, 62' and the collimating mirror 16 is actually much greater than shown, especially when compared with the distance between the fibers 62, 62' at their exits. Thus, the initial separation of the beam paths of sample light 62 and the reference light 62' has negligible effect on what is substantially collinear beam propagation 72 after collimating mirror 70.

Figure 4:
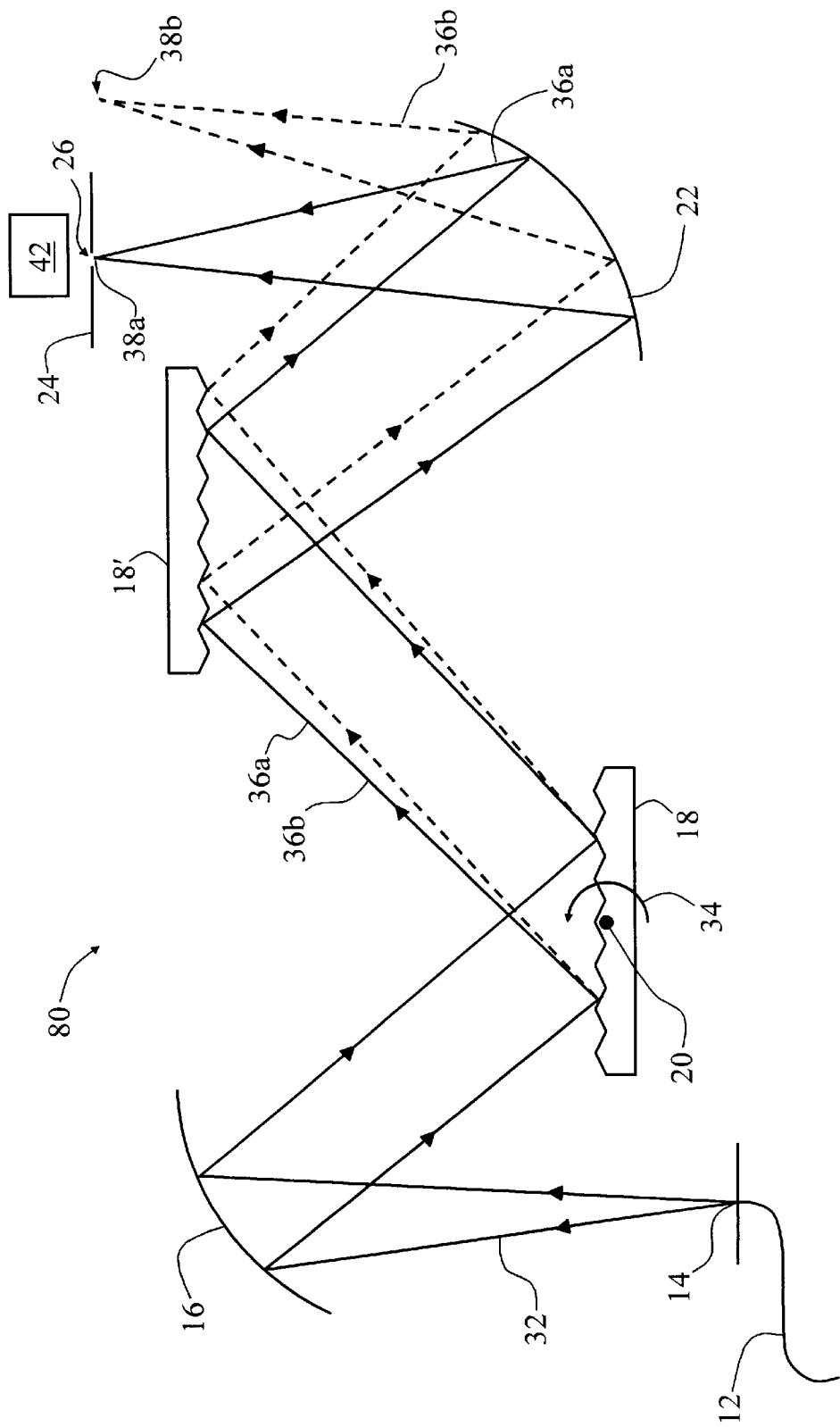
FIG. 4 is a schematic view of a optical spectrum analyzer and monochromator apparatus according to another preferred embodiment of the present invention, including multiple diffraction gratings.

FIG. 4 is a schematic view of a optical spectrum analyzer and monochromator apparatus 80 according to another preferred embodiment of the present invention, including multiple dispersing means, each in the form of a diffraction grating, in order to increase resolution, accuracy and sampling rate.

In most respects apparatus 80 is comparable to apparatus 10 of FIG. 1, so like reference numerals have been used to indicate like features. However, whereas in apparatus 10 of FIG. 1 light is reflected from diffraction grating 18 onto focusing mirror 22, in apparatus 80 this light is first reflected from additional (non-rotating) diffraction grating 18', and from there onto focusing mirror 22. The use of additional diffraction grating 18' further increases the wavelength resolution of light received at scale of detection aperture 26. Indeed, further diffraction gratings could be added in like manner (between additional diffraction grating 18' and focusing mirror 22) to further increase this resolution.

Modifications within the spirit and scope of the invention may be readily effected by a person skilled in the art. Thus, it is to be understood that this invention is not limited to the particular embodiments described by way of example hereinabove.

We claim:

1. An apparatus for determining the wavelength of a sample source of light, said apparatus having:
   a reference light source of known wavelength;
   a collimator for collimating light from said sample source and from said reference source;
   a dispersing means for receiving and spatially dispersing collimated light from said collimator according to wavelength;
   focusing means for focusing dispersed light from said dispersing means; and
   a photodetector located in the focal plane of said focusing means and having an aperture for spatially selectively admitting light from said focusing means, and operable to provide a temporally calibratable output signal indicative of the wavelength of said selectively admitted light;
   wherein said apparatus is operable to provide relative rotation of said dispersing means of uniform speed and thereby scan said focused spatially dispersed beam across said aperture, and said photodetector output includes a resolvable reference feature corresponding to light from said reference source and a resolvable sample feature corresponding to light from said sample source, and said apparatus includes a timer for determining a time difference between detection of said reference feature and detection of said sample feature whereby a wavelength difference between said light from said reference source and said sample source can be determined from said time difference and said speed, and said wavelength of said sample source can be determined from said wavelength difference and said known wavelength of reference source.

2. An apparatus as claimed in claim 1, including a beam splitter and a further photodetector, said beam splitter directing some of said light from said sample source and from said reference source to said further photodetector, wherein said further photodetector is operable to provide an output signal indicative of the power of said sample source.

3. An apparatus as claimed in claim 2, wherein said light from said reference source is coupled to said light from said sample source optically after said beam splitter and optically before said collimator, to provide collinear beam propagation without affecting the accuracy of power measurements of the sample light.

4. An apparatus as claimed in claim 2, wherein said apparatus is operable to determine the integrated power of said sample source independent of the wavelength spectrum of said sample source, and said further photodetector output is indicative of the total power of said light from said sample source.

5. An apparatus as claimed in claim 2, wherein said photodetector and said further photodetector are provided as a single photodetector.

6. An apparatus as claimed in claim 2, including an input aperture for admitting said light from said sample source into said apparatus.

7. An apparatus as claimed in claim 1, wherein said apparatus is operable or configured to direct said focused, dispersed beam in a direction that rotates relative to said aperture with substantially constant angular velocity.

8. An apparatus as claimed in claim 1, wherein said dispersing means is a mechanical dispersing means.

9. An apparatus as claimed in claim 1, wherein said dispersing means is a diffraction grating.

10. An apparatus as claimed in claim 1, wherein said dispersing means is a prism.

11. An apparatus as claimed in claim 1, wherein said dispersing means is a non-mechanical dispersing means.

12. An apparatus as claimed in claim 1, wherein said dispersing means operates by acousto-optic, electro-optic or non-linear beam deflection.

13. An apparatus as claimed in claim 1, wherein said dispersing means comprises a combination of both mechanical and non-mechanical dispersing means.

14. An apparatus as claimed in claim 1, wherein said aperture comprises a physical aperture in a mask over the photodetector, the core of an optical fiber, or a portion of the face of the photodetector.

15. An apparatus as claimed in claim 1, wherein said dispersing means is a mechanical dispersing means operable to be rotated relative to other optical elements, either by rotating said dispersing means while maintaining said other optical elements stationary or by rotating said other optical elements while maintaining said dispersing means stationary, whereby scan said spatially dispersed beam is scanned across said aperture.

16. An apparatus as claimed in claim 1, wherein said dispersing means is a diffracting means.

17. An apparatus as claimed in claim 16, wherein said dispersing means is a rotatable diffraction grating.

18. An apparatus as claimed in claim 1, wherein said dispersing means is a rotatable prism.

19. An apparatus as claimed in claim 1, wherein said reference source is a stable source of ultra-narrow linewidth.

20. An apparatus as claimed in claim 1, wherein said reference light source comprises a broadband source with a suitable filter.

21. An apparatus as claimed in claim 1, wherein said reference light source comprises a portion of said light from said sample source reflected from the rear of the rotating dispersing element when said light from said sample source strikes the rear of said rotating dispersing element.

22. An apparatus as claimed in claim 21, wherein said portion of said light from said sample source reflected from said rear of said rotating dispersing element is used to provide a wavelength independent timing signal for wavelength calibration and triggering of data sampling operations.

23. An apparatus as claimed in claim 1, wherein said reference light source comprises a portion of said light from said sample source that is subjected to zero order diffraction from said diffracting means.

24. An apparatus as claimed in claim 1, wherein said collimator is a collimating mirror.

25. An apparatus as claimed in claim 1, wherein said collimator is comprises at least one collimating lens.

26. An apparatus as claimed in claim 1 wherein said focusing means comprises at least one lens.

27. An apparatus as claimed in claim 1, wherein said focusing means comprises at least one focusing mirror.

28. An apparatus as claimed in claim 1, wherein said apparatus is operable to use said reference source to measure the speed of revolution of said dispersing means.

29. An apparatus as claimed in claim 1, including a data analysis system for resolving said photodetector output signal with respect to time and thereby create temporal data, and for translating said temporal data to calibrated wavelength data.

30. An apparatus as claimed in claim 29, including means for time averaging and statistically analyzing collected data so that more accurate wavelength data can be produced from said apparatus.

31. An apparatus as claimed in claim 1, wherein said apparatus has a single pass optical geometry, or is operable as a single pass scanning monochromator.

32. An apparatus as claimed in claim 1, wherein said apparatus has a double or multiple pass optical geometry, or is operable as a double pass or multiple pass scanning monochromator.

33. An apparatus as claimed in claim 1, including a plurality of photodetectors disposed about said dispersing means, to improve any one or more of resolution, accuracy and sampling rate.

34. An apparatus as claimed in claim 1, including a plurality of dispersing means to increase any one or more of resolution, accuracy and sampling rate.

35. An apparatus as claimed in claim 1, including dividing means for dividing said light from said sample source into major and minor components, said minor component constituting a secondary sample beam.

36. An apparatus as claimed in claim 35, wherein said secondary sample beam comprises a reflection from a coated or uncoated piece of glass.

37. An apparatus as claimed in claim 35, wherein said secondary sample beam comprises a reflection from a polarizer cube or other partially reflecting optical filter.

38. An apparatus as claimed in claim 2, wherein said beam splitter is polarization selective and adjustable to allow polarization dependent measurement of the wavelength of said light from said sample source.

39. An apparatus as claimed in claim 2, wherein said beam splitter is polarization selective and adjustable to allow polarization dependent measurement of the power of said light from said sample source.

40. An apparatus as claimed in either claim 38, wherein said beam splitter is a polarizer filter or polarizing cube.

41. An apparatus as claimed in claim 1, including a plurality of photodetectors to measure wavelengths at a variety of positions along the dispersed plane of said light from said sample source.

42. An apparatus as claimed in claim 1, including one or more detectors whose measurement is substantially independent of wavelength and can be accurately calibrated to measure total power of the sample source.

43. An apparatus as claimed in claim 42, wherein said one or more detectors comprise thermopile or pyroelectric detectors.

44. An apparatus as claimed in claim 2, wherein said further photodetector is a wavelength independent detector and located in the path of said light from said sample source such that said wavelength independent detector produces a signal indicative of the instantaneous total optical power of said light from said sample source.

45. An apparatus as claimed in claim 1, wherein said apparatus is operable to test, measure or monitor light output from one or more light sources in an optical communications network.

46. An apparatus as claimed in claim 1, that is used as a wavelength or power measurement component in an optical network analyzer device.

47. An apparatus as claimed in claim 39, wherein said beam splitter is a polarizer filter or polarizing cube.

48. A method of determining wavelength of a sample source of light, involving:
   providing a reference beam of light of known wavelength;
   collimating light from said sample source and collimating light from said reference beam;
   dispersing said collimated light to produce a spatially dispersed beam;
   focusing said dispersed beam;
   scanning said focused, dispersed beam across a detector aperture of a detector at a uniform speed to thereby spatially selectively detect focused light and produce a temporally calibratable output signal indicative of said selectively detected light;
   resolving in said output signal a sample feature corresponding to said light from said sample source and a reference feature corresponding to said reference beam;
   determining a time difference between detection of said sample feature and detection of reference feature; and
   deriving a wavelength difference between said sample source and said reference source from said time difference and the speed of said scanning of said focused, dispersed beam;
   whereby said wavelength of said sample source can be determined from said wavelength difference and said known wavelength of reference source.

49. A method as claimed in claim 48, including:
   beam splitting said light from said sample source and said reference beam;
   directing some of said light from said sample source and some of said reference beam to a further detector; and
   generating an output signal indicative of the power of said sample source.

50. A method as claimed in claim 49, including coupling said reference beam to said light from said sample source after said beam splitting and before said collimating, to provide collinear beam propagation without affecting the accuracy of power measurements of the sample light.

51. A method as claimed in claim 49, including determining the integrated power of said sample source independent of the wavelength spectrum of said sample source, wherein said output signal is indicative of the total power of said light from said sample source.

52. A method as claimed in claim 49, wherein said detector and said further detector are provided as a single photodetector.

53. A method as claimed in claim 49, including admitting said light from said sample source through an input aperture.

54. A method as claimed in claim 48, including dispersing said collimated beam by means of a diffracting means.

55. A method as claimed in claim 48, including dispersing said collimated beam by means of a rotatable diffraction grating.

56. A method as claimed in claim 48, including using said reference beam to measure the speed of revolution of said diffracting means.

57. A method as claimed in claim 48, including detecting said focused light by means of a plurality of photodetectors disposed about said dispersing means, to improve any one or more of resolution, accuracy and sampling rate.

58. A method as claimed in claim 48, including employing a plurality of photodetectors, and calibrating the amplitude of the outputs of said photodetectors versus wavelength.

59. A method as claimed in claim 58, wherein said plurality of photodetectors includes a reference measurement of said reference beam in the form of a thermoelectric detector.

60. A method as claimed in claim 48, including increasing any one or more of resolution, accuracy and sampling rate by employing a plurality of diffracting means.

61. A method as claimed in claim 48, including providing said reference beam by means of a stable source of ultra-narrow linewidth.

62. A method as claimed in claim 48, including providing said reference beam by means of a broadband source with a suitable filter.

63. A method as claimed in claim 48, including collimating said light from said sample source and said reference beam by means of at least one collimating lens.

64. A method as claimed in claim 48, including collimating said light from said sample source and said reference beam by means of at least one collimating mirror.

65. A method as claimed in claim 48, including focusing said dispersed beam by means of at least one lens.

66. A method as claimed in claim 48, including focusing said dispersed beam by means of at least one focusing mirror.

67. A method as claimed in claim 48, including translating temporal data to calibrated wavelength data.

68. A method as claimed in claim 48, wherein said method is a single pass scanning method.

69. A method as claimed in claim 48, wherein said method is a double pass or multiple pass scanning method.

70. A method as claimed in claim 48, including time averaging and statistically analyzing collected data to produce more accurate wavelength data.

71. A method as claimed in claim 48, including converting acquired temporal data into calibrated spectral measurements of said sample source.

72. A method as claimed in claim 48, including using a plurality of photodetectors to increase the sampling rate and dynamic range within a single scan operation.

73. A method as claimed in claim 72, wherein said plurality of photodetectors includes at least one thermoelectric detector as a wavelength independent reference measurement.

74. A method as claimed in claim 49, including using a wavelength independent detector to measure the absolute optical power.

75. A method as claimed in claim 74, including referencing relative measurements of intensity by said detector to said absolute power measurement by said wavelength independent detector to provide an optical power spectrum.

76. An apparatus for determining the wavelength of a sample source of light, said apparatus having:
   a reference light source of known wavelength;
   a collimator for collimating light from said sample source and from said reference source;
   a dispersing means for receiving and spatially dispersing collimated light from said collimator according to wavelength, said dispersing means comprising a combination of both mechanical and non-mechanical dispersing means;
   focusing means for focusing dispersed light from said dispersing means; and
   a photodetector located in the focal plane of said focusing means and having an aperture for spatially selectively admitting light from said focusing means, and operable to provide a temporally calibratable output signal indicative of the wavelength of said selectively admitted light;
   wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source.

77. An apparatus for determining the wavelength of a sample source of light, said apparatus having:
   a reference light source of known wavelength;
   a collimator for collimating light from said sample source and from said reference source;
   a dispersing means for receiving and spatially dispersing collimated light from said collimator according to wavelength;
   focusing means for focusing dispersed light from said dispersing means; and
   a photodetector located in the focal plane of said focusing means and having an aperture for spatially selectively admitting light from said focusing means, and operable to provide a temporally calibratable output signal indicative of the wavelength of said selectively admitted light;
   wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source, and said apparatus is operable to use said reference source to measure the speed of revolution of said dispersing means.

78. An apparatus for determining the wavelength of a sample source of light, said apparatus having:
   a reference light source of known wavelength;
   a collimator for collimating light from said sample source and from said reference source;
   a dispersing means for receiving and spatially dispersing collimated light from said collimator according to wavelength;

focusing means for focusing dispersed light from said dispersing means; and a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source, and wherein said apparatus has a double or multiple pass optical geometry or is operable as a double pass or multiple pass scanning monochromator.

79. An apparatus for determining the wavelength of a sample source of light, said apparatus having:

a reference light source of known wavelength;

a collimator for collimating light from said sample source and from said reference source;

a dispersing means for receiving and spatially dispersing collimated light from said collimator according to wavelength;

focusing means for focusing dispersed light from said dispersing means; and a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source, and wherein said apparatus includes a plurality of dispersing means to increase any one or more of resolution. accuracy and sampling rate.

80. An apparatus for determining the wavelength of a sample source of light, said apparatus having:

a reference light source of known wavelength;

a collimator for collimating light from said sample source and from said reference source;

a dispersing means for receiving and spatially dispersing collimated light from said collimator according to wavelength;

focusing means for focusing dispersed light from said dispersing means; and a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source, and said apparatus includes dividing means for dividing said light from said sample source into major and minor components, said minor component constituting a secondary sample beam comprising a reflection from a coated or uncoated piece of glass, or from a polarizer cube or other partially reflecting optical filter.

81. An apparatus for determining the wavelength of a sample source of light, said apparatus having:

a reference light source of known wavelength;

a collimator for collimating light from said sample source and from said reference source;

a dispersing means for receiving and spatially dispersing collimated light from said collimator according to wavelength;

focusing means for focusing dispersed light from said dispersing means; and a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source, and wherein said apparatus includes a beam splitter and a further photodetector, said beam splitter directing some of said light from said sample source and from said reference source to said further photodetector, wherein said further photodetector is operable to provide an output signal indicative of the power of said sample source, and said beam splitter is polarization selective and adjustable to allow polarization dependent measurement of the wavelength or of the power of said light from said sample source.

82. An apparatus as claimed in claim 81, wherein said beam splitter is a polarizer filter or polarizing cube.

83. An apparatus for determining the wavelength of a sample source of light, said apparatus having:

a reference light source of known wavelength;

a collimator for collimating light from said sample source and from said reference source;

a dispersing means for receiving and spatially dispersing collimated light from said collimator according to wavelength;

focusing means for focusing dispersed light from said dispersing means; and a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source, and wherein said apparatus includes a plurality of photodetectors to measure wavelengths at a variety of positions along the dispersed plane of said light from said sample source.

84. An apparatus for determining the wavelength of a sample source of light, said apparatus having:

a reference light source of known wavelength;

a collimator for collimating light from said sample source and from said reference source;

a dispersing means for receiving and spatially dispersing collimated light from said collimator according to wavelength;

focusing means for focusing dispersed light from said dispersing means; and a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable feature corresponding to light from said reference source and sample source, whereby a time difference between said features is indicative of a wavelength difference between said light from said reference source and said sample source, and said apparatus includes one or more detectors comprising thermopile or pyroelectric detectors whose measurement is substantially independent of wavelength and which can be accurately calibrated to measure total power of the sample source.

85. An apparatus for determining the wavelength of a sample source of light, said apparatus having:

a reference light source of known wavelength;

a collimator for collimating light from said sample source and from said reference source;

a dispersing means for receiving and spatially dispersing collimated light from said collimator according to wavelength;

focusing means for focusing dispersed light from said dispersing means; and a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source, and wherein said apparatus is operable to test, measure or monitor light output from one or more light sources in an optical communications network.

86. An apparatus for determining the wavelength of a sample source of light, said apparatus having:

a reference light source of known wavelength;

a collimator for collimating light from said sample source and from said reference source;

a dispersing means for receiving and spatially dispersing collimated light from said collimator according to wavelength;

focusing means for focusing dispersed light from said dispersing means; and a photodetector located in the focal plane of said focusing means and having an aperture for spatially selectively admitting light from said focusing means, and operable to provide a temporally calibratable output signal indicative of the wavelength of said selectively admitted light;

wherein said apparatus is operable to scan said focused spatially dispersed beam across said aperture, and said photodetector output includes resolvable features corresponding to light from said reference source and sample source, whereby a time difference between said features is indicative of a wavelength difference between said light from said reference source and said sample source, and wherein said apparatus is used as a wavelength or power measurement component in an optical network analyzer device.

87. An apparatus as claimed in claim 86, wherein said beam splitter is a polarizer filter or polarizing cube.

88. A method of determining wavelength of a sample source of light, involving:

providing a reference beam of light of known wavelength;

collimating light from said sample source and collimating light from said reference beam;

dispersing said collimated light to produce a spatially dispersed beam;

focusing said dispersed beam;

scanning said focused, dispersed beam across a detector aperture and to thereby spatially selectively detect focused light and produce a temporally calibratable output signal indicative of said selectively detected light; and resolving features corresponding to said light from said sample source and to said reference beam;

whereby a time difference between said features is indicative of a wavelength difference between said reference beam and said light from said sample source, and said method includes using said reference beam to measure the speed of revolution of said diffracting means.

89. A method of determining wavelength of a sample source of light, involving: providing a reference beam of light of known wavelength;

collimating light from said sample source and collimating light from said reference beam;

dispersing said collimated light to produce a spatially dispersed beam;

focusing said dispersed beam;

scanning said focused, dispersed beam across a detector aperture and to thereby spatially selectively detect focused light and produce a temporally calibratable output signal indicative of said selectively detected light; and resolving features corresponding to said light from said sample source and to said reference beam;

whereby a time difference between said features is indicative of a wavelength difference between said reference beam and said light from said sample source, and said method includes employing a plurality of photodetectors and calibrating the amplitude of the outputs of said photodetectors versus wavelength.

90. A method as claimed in claim 89, wherein said plurality of photodetectors includes a reference measurement of said reference beam in the form of a thermoelectric detector.

91. A method of determining wavelength of a sample source of light, involving:

providing a reference beam of light of known wavelength;

collimating light from said sample source and collimating light from said reference beam;

dispersing said collimated light to produce a spatially dispersed beam;

focusing said dispersed beam;

scanning said focused, dispersed beam across a detector aperture and to thereby spatially selectively detect focused light and produce a temporally calibratable output signal indicative of said selectively detected light; and resolving features corresponding to said light from said sample source and to said reference beam;

whereby a time difference between said features is indicative of a wavelength difference between said reference beam and said light from said sample source, and said method includes increasing any one or more of resolution, accuracy and sampling rate by employing a plurality of diffracting means.

92. A method of determining wavelength of a sample source of light, involving:

providing a reference beam of light of known wavelength;

collimating light from said sample source and collimating light from said reference beam;

dispersing said collimated light to produce a spatially dispersed beam;

focusing said dispersed beam;

scanning said focused, dispersed beam across a detector aperture and to thereby spatially selectively detect focused light and produce a temporally calibratable output signal indicative of said selectively detected light; and resolving features corresponding to said light from said sample source and to said reference beam;

whereby a time difference between said features is indicative of a wavelength difference between said reference beam and said light from said sample source, and said method is a double pass or multiple pass scanning method.

93. A method of determining wavelength of a sample source of light, involving:

providing a reference beam of light of known wavelength;

collimating light from said sample source and collimating light from said reference beam;

dispersing said collimated light to produce a spatially dispersed beam;

focusing said dispersed beam;

scanning said focused, dispersed beam across a detector aperture and to thereby spatially selectively detect focused light and produce a temporally calibratable output signal indicative of said selectively detected light; and resolving features corresponding to said light from said sample source and to said reference beam;

whereby a time difference between said features is indicative of a wavelength difference between said reference beam and said light from said sample source, and said method includes using a plurality of photodetectors to increase the sampling rate and dynamic range within a single scan operation.

94. A method as claimed in claim 93, wherein said plurality of photodetectors includes at least one thermoelectric detector as a wavelength independent reference measurement.

95. A method of determining wavelength of a sample source of light, involving:

providing a reference beam of light of known wavelength;

collimating light from said sample source and collimating light from said reference beam;

dispersing said collimated light to produce a spatially dispersed beam;

focusing said dispersed beam;

scanning said focused, dispersed beam across a detector aperture and to thereby spatially selectively detect focused light and produce a temporally calibratable output signal indicative of said selectively detected light; and resolving features corresponding to said light from said sample source and to said reference beam;

whereby a time difference between said features is indicative of a wavelength difference between said reference beam and said light from said sample source, and said method further includes:

beam splitting said light from said sample source and said reference beam;

directing some of said light from said sample source and some of said reference beam to a further detector;

generating an output signal indicative of the power of said sample source;

using a wavelength independent detector to measure the absolute optical power; and referencing relative measurements of intensity by said detector to said absolute power measurement by said wavelength independent detector to provide an optical power spectrum.

* * * * *